No. 606,740. Patented July 5, 1898.
W. C. ROWE.
FEEDER FOR CORN SHELLERS.
(Application filed Oct. 9, 1897.)
(No Model.)
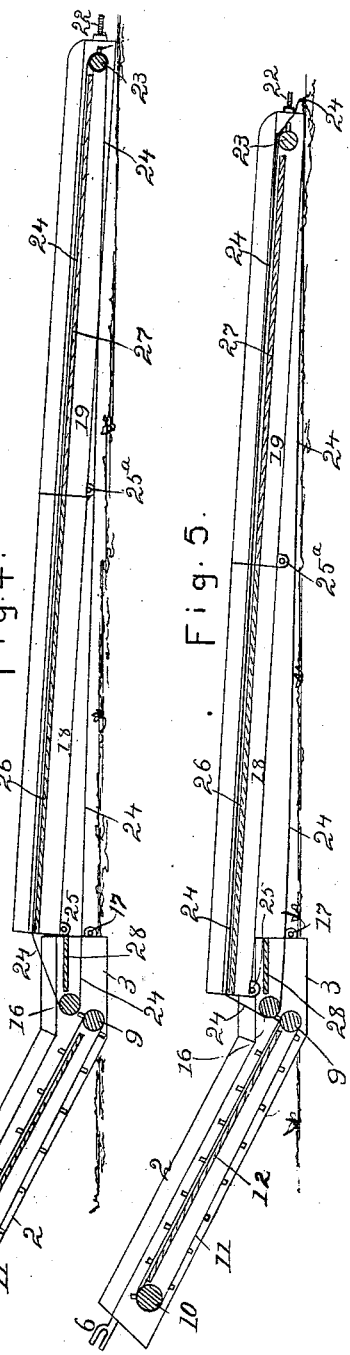
Attest.
Ina Graham.
Nora Graham.
INVENTOR
W. C. Rowe
by L. P. Graham
his attorney

UNITED STATES PATENT OFFICE.

WILLARD C. ROWE, OF DECATUR, ILLINOIS, ASSIGNOR TO THE UNION IRON WORKS, OF SAME PLACE.

FEEDER FOR CORN-SHELLERS.

SPECIFICATION forming part of Letters Patent No. 606,740, dated July 5, 1898.

Application filed October 9, 1897. Serial No. 654,668. (No model.)

*To all whom it may concern:*

Be it known that I, WILLARD C. ROWE, of Decatur, in the county of Macon and State of Illinois, have invented certain new and useful Improvements in Feeders for Corn-Shellers, of which the following is a specification.

The shelling capacity of modern shellers has been developed to such an extent that the old mode of shoveling corn from the cribs to the hopper or to a drag running to the hopper has become insufficient, and steps have been taken to supply the deficiency in an economical manner by providing power-driven feeders adapted to take the corn from the cribs by action of gravity on the corn and deliver it to the sheller with but little attention or manual labor. The conditions and requirements confronting the experimenter in this direction are as follows: The cribs are built up from near the ground as a general thing, and a feeder-drag that will most nearly take the entire contents of a crib by action of gravity must extend horizontally alongside a crib as low down as is practicable. The cribs are so disposed that the feeder needs occasional shifting to reach all the cribs of a group. The feeder must extend quite a distance to give best results and is therefore so long as to be unwieldy as a whole. It is necessary to the practical operation of the feeder that it be made in sections light enough to handle and convey and that the connections between sections shall permit ready detachment and reattachment of the parts. It is the purpose of this invention to meet these conditions and supply the requirements in a simple, practical, and superior manner, and particularly to provide for continuous horizontal extension of the different sections of the corn-receiving part of the feeder.

The invention is exemplified in the structure hereinafter described, and it is defined in the appended claims.

In the drawings forming part of this specification, Figure 1 is a diagram showing in side elevation the construction of a feeder embodying my invention. Fig. 2 is a cross-section on line $x$ in Fig. 1. Fig. 3 is a longitudinal vertical section through the center of the feeder. Figs. 4 and 5 are longitudinal vertical sections through the center of the feeder, illustrating certain peculiarities of construction and operation.

In constructing a feeder in accordance with my invention I make a deflected section of drag-frame, as 1, one portion of which extends in a horizontal direction, while the other extends obliquely upward. In the drawings the horizontal portion is shown at 3 and the oblique portion at 2. In the upper end of the oblique portion of the deflected section I journal a transverse shaft 4. On an extended end of the shaft I fix a sprocket-wheel 5, and on the intermediate portion of the shaft, between the side walls of the frame, I fix a roller 10. In the lower end of the oblique portion of the deflected section I journal a shaft 7. On an extended end of the shaft I fix a sprocket-wheel 8, and on the intermediate portion of the shaft I fix a roller 9. Around the rollers 9 and 10 I place a drag-belt 11, which is preferably supplied with cross-cleats, and under the upper run of the belt is placed a sustaining-board 12. The upper end of the oblique portion of the deflected section is supplied with a pair of supporting-arms 6, which are forked to receive a cross-shaft of the driving mechanism, by means of which the feeder is operated. In the horizontal portion of the deflected section above shaft 7 is journaled a shaft 13. On an end of the shaft is fixed a sprocket-wheel 14, which is preferably of greater diameter than wheel 8, and on the intermediate portion of the shaft is fixed a roller 16. The wheel 13 is connected with wheel 8 by means of chain 15, and perforated lugs 17 extend horizontally from the end of the horizontal portion of the deflected section.

A horizontal section of drag-frame 18 is made to abut endwise against the horizontal portion of the deflected section in horizontal alinement therewith, and it has a pair of vertically-depending perforated lugs 25, which coincide with lugs 17 and by means of which the horizontal section is connected with the deflected section through pins or the like inserted in the perforations. Ordinarily there are a plurality of horizontal sections conjoined to form a continuous drag, and in this instance a second section is shown at 19. This section has a pair of vertically-depending lugs 25ª, which are adapted to coincide with the horizontally-extending lugs 20 of section 18, thus providing for fastening the two horizontal sections together, and it has in its extended or outer end a roller 23. The roller is mounted on a shaft 21, which is journaled in a belt-tightener 22, and a drag-belt 24, preferably without cleats, runs from the roller 16 of the deflected section around roller 23 in the outer end of section 19. The horizontal portion of the deflected section has a sustaining-board 28 under the upper run of the belt 24, horizontal section 18 has a sustaining-board 26, and section 19 has a sustaining-board 27. The sustaining-boards 26, 27, and 28 coincide longitudinally one with the others when the feeder is in operative position.

When the device is in operation, the forked ends of arms 6 are made to embrace a transverse drive-shaft located above the point of discharge of the feeder, which is usually the receiving end of the short drag communicating directly with the sheller-hopper, and a chain is run from a wheel on the drive-shaft to wheel 5. The horizontal extension of the feeder is laid alongside a set of adjacent cribs, a few rails are removed from the lower portions of the cribs immediately above the feeder, and the corn is permitted to slide from the cribs into the feeder-trough. The drag-belts travel in the direction indicated by the adjacent arrows, and the corn is carried by belt 24 to belt 11 and by belt 11 to the point of discharge at the upper end of the oblique portion of the deflected section. It is an advised mode of operation to first open the crib farthest from the sheller and permit it to empty itself so far as gravity is able to act, then open the next farthest crib and shovel the corn remaining in the first-opened crib onto the far end of the drag while the second-opened crib is emptying itself, and so on to the end; but the utility of the device does not depend upon this or any other invariable mode of procedure.

As the drag-belt 24 is horizontal it may carry the corn without cleats, and the omission of the cleats is advantageous in preventing stalling of the belt. If more corn is supplied than the belt can drag, the belt will slip under the load and gradually relieve itself by carrying off portions nearest its discharging end, while if cleats were used the belt would stop entirely when overloaded and a part of the load would have to be removed before it would start. The oblique belt is supplied with cleats, for the reason that its upward travel requires something of the kind to hold the corn, and as this belt does not receive corn directly from the crib there is not the liability to overload that attends belt 24. To make it entirely certain that the oblique belt will not become overloaded, it is driven at a slightly-greater speed than is the horizontal belt from which it receives its supply. The entire upper run of belt 24 is in one horizontal line, so that the crib farthest from the sheller may be as nearly emptied by force of gravity as may the nearest one. The one horizontal belt may be extended to act with as many horizontal sections as are desired, and so there is provided a plurality of horizontal corn-receiving sections arranged in a manner to permit easy manipulation and without the inconvenience of a multiplicity of belts and adjuncts thereof. When for any purpose it is desirable to detach the sections of the feeder from one another, the pins connecting lugs 17 with 25 are withdrawn, the inner end of section 18 is raised, as shown in Fig. 4, and the horizontal sections are moved lengthwise to the position shown in Fig. 5. When this is done, there is sufficient slack in the belt 24 to permit it to be slipped off roller 23 and around the outer end of section 19. The horizontal sections may then be separated from each other in an obvious manner, the belt may be folded compactly and laid on the horizontal portion of the deflected section, and the entire device is in condition for easy handling or compact storing. Should the belt be running too tight to permit the end of section 18 to be raised to the position shown in Fig. 4, the belt-tighter may be loosened enough to provide sufficient slack.

The vertical disconnecting movement of section 18 depends upon the horizontal extension of lugs 17 and the vertical extension of lugs 25. The relatively stationary lugs extend below the movable section and the lugs of the movable section do not interfere with the movement.

While a plurality of horizontal sections is preferred, it will be seen that a single one would be operative. In that case the roller 23 would be placed in the outer end of the single horizontal section and the operation would be substantially the same as if there were no joint between sections 18 and 19.

What I claim as new, and desire to secure by Letters Patent, is—

1. A feeder for corn-shellers comprising a deflected section of drag-frame one end of which extends horizontally and the other end of which extends obliquely upward, a horizontal section of drag-frame abutting endwise against the horizontal portion of the deflected section, and separable therefrom, a drag-belt in the oblique portion of the deflected section, and a second drag-belt extending through the horizontal section and the horizontal portion of the deflected section and discharging onto the lower end of the oblique belt.

2. A feeder for corn-shellers comprising a deflected section of drag-frame one end of which extends horizontally and the other end of which extends obliquely upward, a horizontal section of drag-frame abutting endwise against the horizontal portion of the deflected section, and separable therefrom, a drag-belt in the oblique portion of the deflected section, carrying cleats to prevent slippage of corn, and a second drag-belt without cleats extending through the horizontal section and the horizontal portion of the deflected section and discharging onto the lower end of the oblique belt.

3. A feeder for corn-shellers comprising a deflected section of drag-frame one end of which extends horizontally and the other end of which extends obliquely upward, a plurality of horizontal sections of drag-frame abutting endwise against each other and against the horizontal portion of the deflected section in a separable manner, a drag-belt in the oblique portion of the deflected section, and a second drag-belt extended through the horizontal sections and the horizontal portion of the oblique section and discharging onto the lower end of the oblique belt.

4. A feeder for corn-shellers comprising a deflected section of drag-frame one end of which extends horizontally and the other end of which extends obliquely upward, a horizontal section of drag-frame abutting endwise against the horizontal portion of the deflected section, and separable therefrom, a drag-belt in the oblique portion of the deflected section, a roller in the horizontal portion of the deflected section above the lower end of the oblique belt, and a second belt running through the horizontal section and around said roller in the horizontal end of the deflected section.

5. A feeder for corn-shellers comprising a deflected section of drag-frame one end of which extends horizontally and the other end of which extends obliquely upward, a horizontal section of drag-frame abutting endwise against the horizontal portion of the deflected section in a manner permitting separation by vertical motion, a drag-belt in the oblique portion of the deflected section, a roller in the horizontal portion of the deflected section over the lower end of the oblique drag-belt, and a second drag-belt extended through the horizontal section and around said roller in the horizontal portion of the deflected section.

6. A feeder for corn-shellers comprising a deflected section of drag-frame one end of which extends horizontally and the other end of which extends obliquely upward, a horizontal section of drag-frame abutting endwise against the horizontal portion of the deflected section, and separable therefrom, a drag-belt in the oblique portion of the deflected section, a roller in the horizontal portion of the deflected section above the lower end of the oblique belt, and a second belt running through the horizontal section and around said roller in the horizontal portion of the deflected section at a speed slower than that of the oblique drag-belt.

7. A feeder for corn-shellers, comprising an elevator-section of drag-frame having a horizontal extension, a horizontal section of drag-frame abutting endwise against the horizontal extension of the elevator-section, and separable therefrom, an elevator-belt in the elevator-section, a drive-roller for the conveyer-belt journaled in the horizontal portion of the elevator-section, such roller being driven from the elevator-belt, and a conveyer-belt running through the horizontal section and the horizontal extension and around the said roller, substantially as set forth.

In testimony whereof I sign my name in the presence of two subscribing witnesses.

WILLARD C. ROWE.

Attest:
  C. M. LYTLE,
  L. P. GRAHAM.